(12) United States Patent
Jaeger

(10) Patent No.: US 8,621,913 B2
(45) Date of Patent: Jan. 7, 2014

(54) USE OF HYDROGEN SENSOR TO DETECT HYDROGEN STORAGE SYSTEM PRESSURE REGULATOR FAILURE

(75) Inventor: Ralf Jaeger, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 13/151,604

(22) Filed: Jun. 2, 2011

(65) Prior Publication Data

US 2012/0305430 A1    Dec. 6, 2012

(51) Int. Cl.
*G01M 3/04* (2006.01)
(52) U.S. Cl.
USPC .......................................................... 73/40
(58) Field of Classification Search
USPC .......................................................... 73/40
See application file for complete search history.

(56) References Cited

FOREIGN PATENT DOCUMENTS

JP    2010015848 A  *  1/2010

* cited by examiner

*Primary Examiner* — Peter Macchiarolo
*Assistant Examiner* — Tamiko Bellamy
(74) *Attorney, Agent, or Firm* — John A. Miller; Miller IP Group, PLC

(57) ABSTRACT

A method and system for using an existing open-environment hydrogen sensor for detecting hydrogen leaking from an atmospheric reference port of a pressure regulator. The atmospheric reference port extension tube of one or more pressure regulators in a hydrogen storage system is routed past a hydrogen sensor which is already used to monitor air around the hydrogen storage system for the presence of hydrogen. In this configuration, the open-environment hydrogen sensor can quickly and reliably detect hydrogen gas flowing from the atmospheric reference port of one of the pressure regulators in the event a pressure regulator develops an internal leak.

20 Claims, 4 Drawing Sheets

USE OF HYDROGEN SENSOR TO DETECT HYDROGEN STORAGE SYSTEM PRESSURE REGULATOR FAILURE

BACKGROUND OF THE INVENTION

1. Field of the Invention

This invention relates generally to detection of hydrogen gas leaking from a pressure regulator and, more particularly, to a method and system for detecting hydrogen leaking from a pressure regulator in a hydrogen storage system for a fuel cell which connects the atmospheric reference port of the pressure regulator to an existing open-environment hydrogen sensor, thus providing both the atmospheric reference pressure signal for the regulator and a means of directly detecting any hydrogen gas leakage from the regulator.

2. Discussion of the Related Art

Fuel cell vehicles are expected to rapidly increase in popularity in the near future in the automotive marketplace. Fuel cell vehicles offer several desirable features, such as virtually pollution-free emissions, and avoiding vehicle usage of petroleum fuels. A key component of fuel cell vehicles is the hydrogen storage system, which stores the hydrogen used as a fuel by most fuel cell vehicles. Hydrogen storage systems typically consist of one or more interconnected pressure vessels for storing gaseous hydrogen, along with numerous valves, gauges, and fittings necessary for operation of the hydrogen storage system. Maximizing vehicle driving range, while fitting within packaging constraints and meeting regulatory requirements, is a key consideration in the design of hydrogen storage systems for fuel cell vehicles.

Fuel cells require a reliable source of hydrogen gas at a prescribed pressure. One or more pressure regulators are used to reduce the hydrogen gas from the high pressure at which it is stored in the vessels to the lower prescribed pressure required by the fuel cell. Although rare, it is possible that a pressure regulator could develop a leak which allows hydrogen gas to flow through an unintended path into the environment.

Existing hydrogen sensors in the exhaust stream may not be able to reliably detect the presence of unintended hydrogen, due to dilution by the exhaust flow and for other reasons. There is a need for a reliable means of detecting hydrogen gas which may leak from a pressure regulator in a hydrogen storage system.

SUMMARY OF THE INVENTION

In accordance with the teachings of the present invention, a method and system are disclosed for using an existing open-environment hydrogen sensor for detecting hydrogen leaking from an atmospheric reference port of a pressure regulator. The atmospheric reference port extension tube of one or more pressure regulators in a hydrogen storage system is routed past a hydrogen sensor which is already used to monitor air around the hydrogen storage system for the presence of hydrogen. In this configuration, the open-environment hydrogen sensor can quickly and reliably detect hydrogen gas flowing from the atmospheric reference port of one of the pressure regulators in the event a pressure regulator develops an internal leak.

Additional features of the present invention will become apparent from the following description and appended claims, taken in conjunction with the accompanying drawings.

DETAILED DESCRIPTION OF THE EMBODIMENTS

The following discussion of the embodiments of the invention directed to use of hydrogen sensors to detect hydrogen storage system pressure regulator failure is merely exemplary in nature, and is in no way intended to limit the invention or its applications or uses. For example, the disclosed methods and systems have particular application to a hydrogen storage system for a fuel cell vehicle, but may also be applicable to detection of leakage of hydrogen or any other gas from pressure regulators in any gas storage or gas handling system.

Fuel cells can be designed to use a variety of fuels, but the fuel cells being developed for most automotive applications use hydrogen gas as a fuel. Such fuel cells require a reliable source of hydrogen gas, typically provided by a hydrogen storage system.

Figure 1:
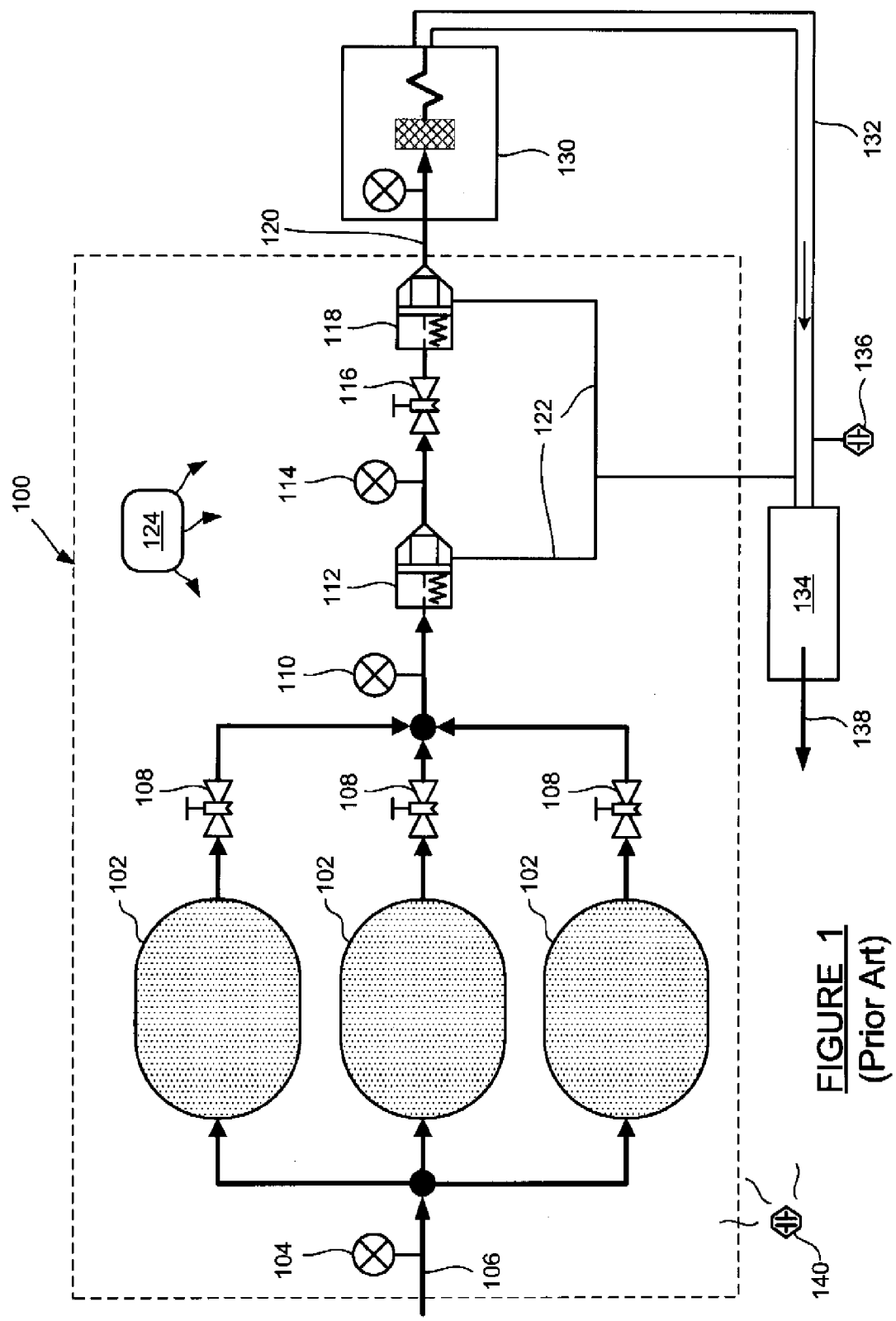
FIG. 1 is a schematic diagram of a typical hydrogen storage system for a fuel cell.

FIG. 1 is a schematic diagram of a typical hydrogen storage system 100 for a fuel cell 130. Pressure vessels 102 store hydrogen gas at a high pressure. More or fewer of the pressure vessels 102 could be used than the three shown in the hydrogen storage system 100. A pressure sensor 104 measures the pressure at a filler line 106 which is used to fill the vessels 102 from an external supply (not shown). Shut-off valves 108 are situated just downstream from each of the pressure vessels 102. The terms upstream and downstream are used throughout this disclosure with respect to the direction of flow from the pressure vessels 102 to the fuel cell 130 and beyond. A pressure sensor 110 measures the hydrogen pressure between the shut-off valves 108 and a pressure regulator 112. The pressure regulator 112 is used to reduce the pressure of the hydrogen gas from the high pressure of the vessels 102 down to a lower pressure which is nearer the pressure required by the fuel cell 130.

A pressure sensor 114 measures the hydrogen pressure downstream of the regulator 112 and upstream of a shut-off valve 116. The shut-off valve 116 can be closed to completely isolate the hydrogen storage system 100 from the fuel cell 130. A second pressure regulator 118 is used to reduce the hydrogen gas pressure down to the relatively low pressure required by the fuel cell 130. Fuel supply line 120 connects the hydrogen storage system 100 to the fuel cell 130. The pressure regulators 112 and 118 each have an atmospheric reference port, the function of which will be discussed in detail below. The atmospheric reference ports (ARPs) of the pressure regulators 112 and 118 are connected to an ARP line 122, also discussed below. A controller 124 monitors conditions in, and controls operation of, the hydrogen storage system 100. For simplicity, the details of the components of the fuel cell 130 are omitted, as are various filters, check valves, relief valves, and other components of the hydrogen storage system 100 which are not relevant to the discussion.

Exhaust gas from the fuel cell 130 flows through exhaust line 132 to diffuser 134. A hydrogen sensor 136 is situated near the exhaust line to diffuser junction, where the sensor 136 can detect any excess concentration of hydrogen gas in the exhaust. Exhaust gas from the fuel cell 130 flows out of the diffuser 134 to the environment at line 138. A hydrogen sensor 140 is situated within or somewhere near the hydrogen storage system 100, such as in a compartment with the tanks 102. The hydrogen sensor 140 is not connected to any other plumbing, but rather is able to detect hydrogen gas in the open environment, such as might be present if there was a leak from one of the tanks 102 or any of the fittings or valves in the hydrogen storage system 100.

The controller 124 is in communication with the pressure sensors 104, 110 and 114, the shut-off valves 108 and 116, the pressure regulators 112 and 118, and the hydrogen sensors 136 and 140. In typical hydrogen storage system designs, a hydrogen sensor, such as the hydrogen sensor 140, may trigger a warning if the concentration of hydrogen gas exceeds a first threshold, such as 2%, and may trigger an alarm if the concentration of hydrogen gas exceeds a second threshold, such as 4%. The controller 124 may be programmed to close the shut-off valves 108 and 116 and shut down the fuel cell 130 in the event of a hydrogen alarm from either the sensor 136 or the sensor 140. The controller 124 may take other actions as well, such as issuing a warning to a driver of the vehicle, and/or recording a diagnostic trouble code (DTC) indicating that an unusually high hydrogen concentration has been detected.

In the hydrogen storage system 100, the ARP line 122 is connected to the exhaust line 132 near the diffuser 134. The ARP line 122 is a simple extension tube which provides ambient or atmospheric pressure to the atmospheric reference ports of the regulators 112 and 118, as would be understood by one skilled in the art, and as will be discussed in detail below. However, if the pressure regulator 112 or 118 were to develop an internal leak, pure hydrogen gas could flow through the ARP line 122.

Figure 2:
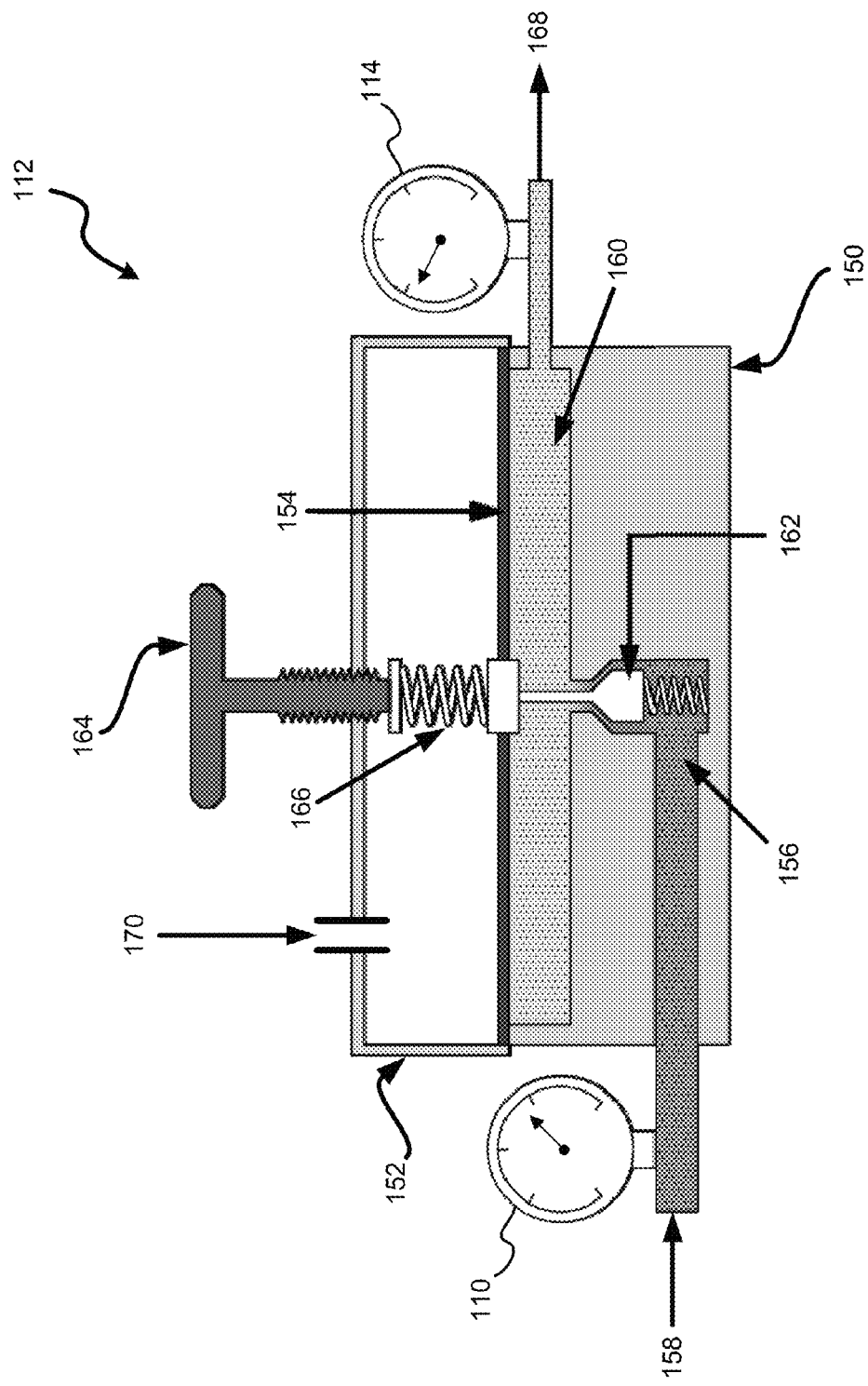
FIG. 2 is a simplified diagram of a pressure regulator, showing the main operational elements including the atmospheric reference port.

FIG. 2 is a simplified diagram of the pressure regulator 112 shown in FIG. 1. The pressure regulator 112 is comprised of a lower body 150 and an upper body 152, separated internally by a membrane 154. The lower body 150 includes a high pressure chamber 156 which receives hydrogen gas at line 158, where the gas at the line 158 is at a relatively high pressure, as indicated by the pressure sensor 110. The lower body 150 also includes a low pressure chamber 160, which is separated from the high pressure chamber 156 by a poppet valve 162. An adjustment handle 164 is used to adjust the pressure in the low pressure chamber 160. As the adjustment handle 164 is turned and threaded further into the upper body 152, a spring 166 exerts more force on the upper end of the poppet valve 162, thus forcing the valve 162 further open and allowing a higher pressure in the low pressure chamber 160. Pressure on the membrane 154 counteracts the force from the spring 166, such that equilibrium is reached and the pressure in the low pressure chamber 160 is based on the position of the adjustment handle 164. Gas from the low pressure chamber 160 flows out of the pressure regulator 112 at line 168, where the gas at the line 168 is at a lower pressure than the inlet at the line 158, as indicated by the pressure sensor 114.

The membrane 154 must be able to react only to the load from the spring 166 and the pressure from the low pressure chamber 160. Thus, it is important that the upper body 152 itself does not act as a chamber which pressurizes and depressurizes with motion of the membrane 154. In order to keep the pressure on the upper side of the membrane 154 at a relatively constant level, irrespective of movement of the membrane 154, it is necessary to vent the upper body 152 to the atmosphere. This venting is accomplished via atmospheric reference port 170. As described previously in the discussion of FIG. 1, the atmospheric reference port 170 is connected to the ARP line 122, which must be able to breathe air at approximately atmospheric pressure.

Pressure regulators such as the pressure regulator 112 are known in the art, and have been used successfully for many years. However, it is also known that various internal failure modes exist for the pressure regulator 112 and similar designs, which could allow hydrogen gas to flow out the atmospheric reference port 170. One such failure mode is a crack in the membrane 154. Another such failure mode is a leak in a gasket (not shown) which is situated around the periphery of the membrane 154. Yet another such failure mode is possible in a different type of pressure regulator, one in which there is a piston-type member (not shown in FIG. 2) which uses o-rings to seal against the upper body 152. In any of these failure mode scenarios, hydrogen gas would leak past the membrane 154 into the upper body 152. Because the leaked hydrogen gas in the upper body 152 would by definition be above atmospheric pressure, the leaked gas would flow out the atmospheric reference port 170 through the ARP line 122.

Although a hydrogen leak through an atmospheric reference port of a pressure regulator is a rare occurrence, it is nonetheless desirable to be able to reliably detect the leaking hydrogen, for a number of reasons. First, a leaking pressure regulator is normally not able to properly hold its set point pressure. Second, leaking hydrogen represents a waste of fuel, which costs the driver money and shortens the driving range of the vehicle. And third, hydrogen gas leaking into the environment where it could locally increase in concentration is not a desirable situation.

In the hydrogen storage system 100, hydrogen gas leaking from the pressure regulators 112 and/or 118 would flow through the ARP line 122 to the exhaust line 132. Even if the hydrogen sensor 136 is positioned very near the inlet from the ARP line 122, the sensor 136 may not detect an abnormally high concentration of hydrogen, due to the dilution from the exhaust flow. It would be advantageous to use a hydrogen sensor which is better able to detect even a light flow of hydrogen gas through the ARP line 122, particularly if such a sensor is already available which can be repurposed for this task.

Figure 3:
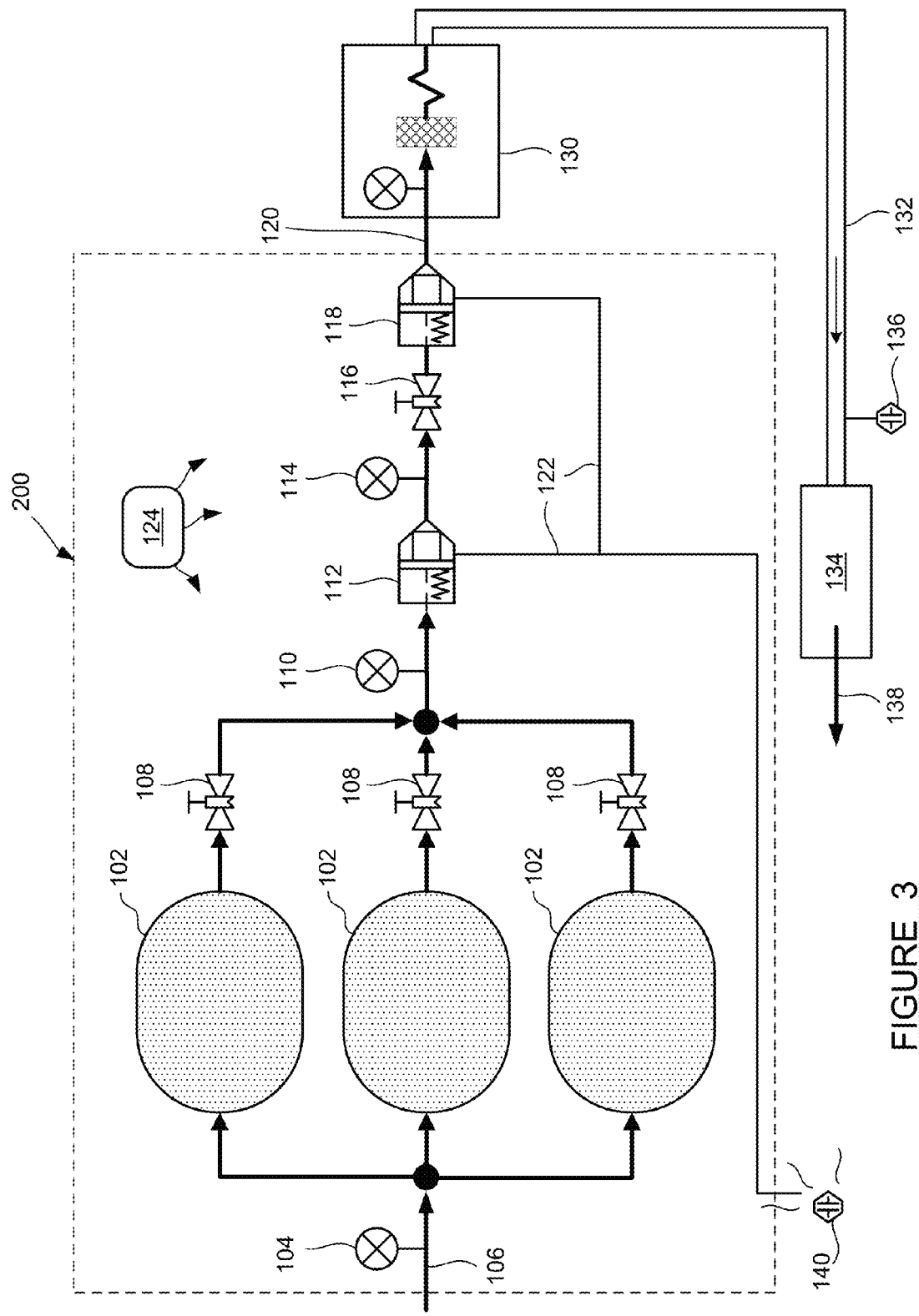
FIG. 3 is a schematic diagram of a hydrogen storage system for a fuel cell which connects the atmospheric reference ports of the pressure regulators to an existing open-environment hydrogen sensor.

FIG. 3 is a schematic diagram of an improved hydrogen storage system 200, which is able to more reliably detect a hydrogen gas leak from the pressure regulator 112 or 118. In the hydrogen storage system 200, the ARP line 122 is not connected to the exhaust line 132 as in the hydrogen storage system 100. Rather, the ARP line 122 is routed to and terminated in close proximity to the hydrogen sensor 140, which is otherwise monitoring environmental air in the vicinity of the storage tanks 102. The hydrogen sensor 140 is situated in an unpressurized environment, and is not connected to any pipes, lines, or fittings. Thus, the ARP line 122 can provide the atmospheric reference pressure needed by the atmospheric reference port 170, and the sensor 140 is ideally situated to detect a flow of hydrogen gas out the ARP line 122 because there is no other high-volume flow to dilute it.

The exact position of the open end of the ARP line 122 relative to the hydrogen sensor 140 can established based on packaging and performance considerations. In one embodiment, the open end of the ARP line 122 would be directed toward the hydrogen sensor 140, and the hydrogen sensor 140 would be within about 15 mm of the open end of the ARP line 122. Other arrangements are possible, as long as the hydrogen sensor 140 can reliably detect hydrogen gas flowing from the pressure regulators 112 and/or 118 via the ARP line 122.

It is possible for the hydrogen sensor 140 to distinguish between a hydrogen leak from the tanks 102 or the adjacent fittings and a hydrogen leak from the pressure regulators 112 and/or 118 through the ARP line 122. For example, the concentration increase rate could be a good indicator of the source of the hydrogen, where a slow concentration increase rate would be indicative of environmental hydrogen gas (leaking from the tanks 102 or fittings, for example) migrating past the hydrogen sensor 140, and a fast concentration increase rate would be indicative of hydrogen gas flowing through the ARP line 122. The hydrogen storage system could also include a second open-environment hydrogen sensor (not shown), positioned remote from the open end of the ARP line 122, such that the difference between the two open-environment hydrogen sensor readings could be used to determine the source of the hydrogen gas.

In any case, both the absolute concentration of hydrogen gas and the concentration increase rate could be used to determine what action should be taken by the controller 124 in the hydrogen storage system 200. Such actions could include recording a diagnostic trouble code (DTC), issuing an audible or visual warning to the driver, initiating certain countermeasures, and/or shutting down the hydrogen storage system 200 and the fuel cell 130 via the shut-off valves 108 and 116.

Figure 4:
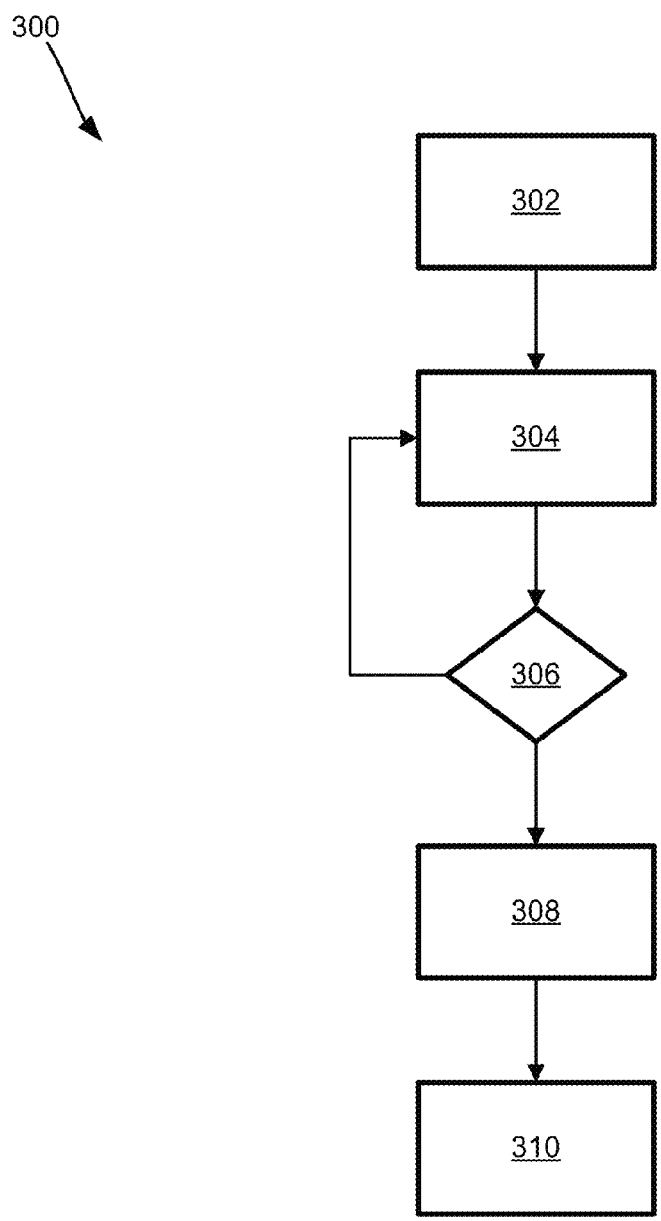
FIG. 4 is a flow chart diagram of a method for using an open-environment hydrogen sensor to detect hydrogen leaking from the atmospheric reference port of a pressure regulator.

FIG. 4 is a flow chart diagram 300 of a method for detecting a hydrogen leak from a pressure regulator using an existing open-environment hydrogen sensor. At box 302, the atmospheric reference port of one or more pressure regulators, such as the pressure regulators 112 and 118, are routed via a tube or hose to an open-environment hydrogen sensor, such as the sensor 140. At box 304, the hydrogen sensor 140 monitors for an increased concentration of hydrogen gas. At decision diamond 306, if there is no actionable concentration of hydrogen gas, the process loops back to continue monitoring at the box 304. If an actionable concentration of hydrogen is detected, at decision diamond 306 the process continues to box 308. At the box 308, parameters are checked to determine a likely source of the hydrogen gas. For example, the rate of increase in concentration could be an indication of whether the hydrogen is present in the open environment in the vicinity of the hydrogen sensor 140, or whether the hydrogen is coming from the pressure regulators 112 and/or 118. At box 310, appropriate actions are taken based on the concentration and likely source of the hydrogen gas. As discussed previously, the actions could include issuing a driver alert, initiating countermeasures, and shutting down the hydrogen storage system 200 and the fuel cell 130.

Using the open-environment hydrogen sensor connectivity described above, it is possible to quickly and reliably detect an internal hydrogen gas leak from a pressure regulator in a hydrogen storage system, thus enabling appropriate action to be taken. This can be done without increasing the cost of the hydrogen storage system, by using an existing open-environment hydrogen sensor.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A gas storage system comprising:
   one or more storage tanks containing a gas at an elevated pressure;
   one or more pressure regulators for reducing pressure of the gas from the elevated pressure to a lower pressure at which the gas is used by a downstream device;
   a first gas sensor for detecting an elevated concentration of the gas in atmospheric air near the storage tanks;
   an extension tube with a first end connected to an atmospheric reference port of the one or more pressure regulators and a second end open to the atmospheric air near enough to the first gas sensor that the first gas sensor can detect any of the gas flowing from the extension tube; and
   a controller for monitoring conditions in the gas storage system and controlling operation of the gas storage system, said controller being in electronic communication with the first gas sensor and being configured to take action if the first gas sensor detects an elevated concentration of the gas.

2. The gas storage system of claim 1 wherein the action includes one or more of; issuing a warning, initiating countermeasures, and shutting down the gas storage system.

3. The gas storage system of claim 1 wherein the controller is configured to distinguish between gas present in the atmospheric air near the storage tanks and gas leaked from the atmospheric reference port of the one or more pressure regulators.

4. The gas storage system of claim 3 wherein the controller uses a rate of increase of gas concentration to distinguish between gas present in the atmospheric air near the storage tanks and gas leaked from the atmospheric reference port of the one or more pressure regulators.

5. The gas storage system of claim 4 wherein the action includes storing a diagnostic trouble code (DTC) in the controller that indicates whether the gas was present in the atmospheric air near the storage tanks or the gas leaked from the atmospheric reference port of the one or more pressure regulators.

6. The gas storage system of claim 3 further comprising a second gas sensor for detecting an elevated concentration of the gas in the atmospheric air near the storage tanks, said second gas sensor not close enough to the second end of the extension tube to detect any of the gas flowing from the extension tube.

7. The gas storage system of claim 6 wherein the controller uses a difference between gas concentrations at the first and second gas sensors to distinguish between gas present in the atmospheric air near the storage tanks and gas leaked from the atmospheric reference port of the one or more pressure regulators.

8. The gas storage system of claim 7 wherein the action includes storing a diagnostic trouble code (DTC) in the controller that indicates whether the gas was present in the atmospheric air near the storage tanks or the gas leaked from the atmospheric reference port of the one or more pressure regulators.

9. The gas storage system of claim 1 wherein the gas storage system is a hydrogen storage system and the downstream device is a fuel cell.

10. The gas storage system of claim 9 wherein the hydrogen storage system and the fuel cell are used in a vehicle.

11. A hydrogen storage system comprising:
    one or more storage tanks containing hydrogen gas at an elevated pressure;
    one or more pressure regulators for reducing pressure of the hydrogen gas from the elevated pressure to a lower pressure at which the hydrogen gas is used by a fuel cell;

a first hydrogen sensor for detecting an elevated concentration of the hydrogen gas in atmospheric air near the storage tanks;
an extension tube with a first end connected to an atmospheric reference port of the one or more pressure regulators and a second end open to the atmospheric air near enough to the first hydrogen sensor that the first hydrogen sensor can detect any of the hydrogen gas flowing from the extension tube;
a second hydrogen sensor for detecting an elevated concentration of the hydrogen gas in the atmospheric air near the storage tanks, said second hydrogen sensor not being close enough to the second end of the extension tube to detect any of the hydrogen gas flowing from the extension tube; and
a controller for monitoring conditions in the hydrogen storage system and controlling operation of the hydrogen storage system, said controller being in electronic communication with the first and second hydrogen sensors.

12. The hydrogen storage system of claim 11 wherein the controller is configured to take action if the first or second hydrogen sensor detects an elevated concentration of the hydrogen gas, where the action includes one or more of; issuing a warning, initiating countermeasures, and shutting down the hydrogen storage system.

13. The hydrogen storage system of claim 11 wherein the controller is configured to distinguish between hydrogen gas present in the atmospheric air near the storage tanks and hydrogen gas leaked from the atmospheric reference port of the one or more pressure regulators.

14. The hydrogen storage system of claim 13 wherein the controller uses a rate of increase of hydrogen gas concentration to distinguish between hydrogen gas present in the atmospheric air near the storage tanks and hydrogen gas leaked from the atmospheric reference port of the one or more pressure regulators.

15. The hydrogen storage system of claim 13 wherein the controller uses a difference between the hydrogen gas concentrations at the first and second hydrogen sensors to distinguish between hydrogen gas present in the atmospheric air near the storage tanks and hydrogen gas leaked from the atmospheric reference port of the one or more pressure regulators.

16. A method for detecting a hydrogen leak from a hydrogen storage system for a fuel cell, said method comprising:
routing an extension tube from an atmospheric reference port of one or more pressure regulators in the hydrogen storage system to a first open-environment hydrogen sensor, such that the first open-environment hydrogen sensor can detect hydrogen gas flowing from the extension tube;
monitoring conditions to detect an elevated concentration of hydrogen gas by the first hydrogen sensor;
evaluating hydrogen concentration parameters to determine a source of the hydrogen leak upon detecting the elevated concentration of hydrogen gas; and
taking appropriate action based on the hydrogen concentration parameters.

17. The method of claim 16 wherein evaluating hydrogen concentration parameters includes evaluating a concentration increase rate.

18. The method of claim 16 wherein evaluating hydrogen concentration parameters includes comparing a hydrogen concentration at the first open-environment hydrogen sensor to a hydrogen concentration at a second open-environment hydrogen sensor which is not located near enough to an open end of the extension tube to detect hydrogen gas flowing from the extension tube.

19. The method of claim 16 wherein taking appropriate action includes one or more of; issuing warnings, initiating countermeasures, and shutting down the hydrogen storage system and the fuel cell.

20. The method of claim 16 wherein the hydrogen storage system and the fuel cell are used in a vehicle.

* * * * *